(12) United States Patent
Ye et al.

(10) Patent No.: US 12,259,749 B2
(45) Date of Patent: Mar. 25, 2025

(54) PORTABLE DISPLAY DEVICE

(71) Applicant: Shenzhen Adreamer Elite Co., Ltd., Guangdong (CN)

(72) Inventors: Tao Ye, Shenzhen (CN); Hongxing Kang, Shenzhen (CN); Qing Zhu, Shenzhen (CN); Ke Wang, Shenzhen (CN); Dingcao Huang, Shenzhen (CN)

(73) Assignee: Shenzhen Adreamer Elite Co., Ltd., Shenzhen (CN)

( * ) Notice: Subject to any disclaimer, the term of this patent is extended or adjusted under 35 U.S.C. 154(b) by 59 days.

(21) Appl. No.: 18/465,422

(22) Filed: Sep. 12, 2023

(65) Prior Publication Data

US 2024/0281025 A1    Aug. 22, 2024

(30) Foreign Application Priority Data

Feb. 22, 2023    (CN) .......................... 202320388293.X

(51) Int. Cl.
  *G06F 1/16*  (2006.01)
(52) U.S. Cl.
  CPC .......... *G06F 1/1607* (2013.01); *G06F 1/1654* (2013.01)
(58) Field of Classification Search
  CPC .... G06F 1/1607; G06F 1/1616; G06F 1/1624; G06F 1/1632; G06F 1/1647; G06F 1/1649
  See application file for complete search history.

(56) References Cited

U.S. PATENT DOCUMENTS

| | | | | |
|---|---|---|---|---|
| 5,590,021 A | * | 12/1996 | Register | G06F 1/1601 361/679.21 |
| 5,768,096 A | * | 6/1998 | Williams | G06F 1/1616 361/679.04 |
| D397,998 S | * | 9/1998 | Ambroe | D14/373 |
| 6,151,401 A | * | 11/2000 | Annaratone | G06F 1/1616 381/388 |
| 6,222,507 B1 | * | 4/2001 | Gouko | G06F 1/1647 361/679.04 |
| 6,302,612 B1 | * | 10/2001 | Fowler | G06F 1/1683 16/224 |
| 6,532,146 B1 | * | 3/2003 | Duquette | G06F 1/1607 361/679.04 |
| 6,643,124 B1 | * | 11/2003 | Wilk | H04M 1/0247 345/169 |
| 6,643,127 B1 | * | 11/2003 | Richardson | G06F 1/1632 312/223.4 |
| 6,667,877 B2 | * | 12/2003 | Duquette | G06F 1/1677 361/679.04 |

(Continued)

*Primary Examiner* — Adrian S Wilson
(74) *Attorney, Agent, or Firm* — MEDLER FERRO WOODHOUSE & MILLS PLLC

(57) ABSTRACT

Provided is a portable display device, which comprises a clamping mechanism and a display body. The clamping mechanism comprises a bracket, a left mounting member, a left connecting member, a right mounting member, and a right connecting member. The left end and the right end of the bracket are respectively provided with a mounting cavity. The left connecting member and the right connecting member are respectively provided with a left L-shaped clamping element and a right L-shaped clamping element, which are symmetrically arranged. The portable display device of the disclosure can accommodate the varied usage habits of different users.

10 Claims, 11 Drawing Sheets

(56) References Cited

U.S. PATENT DOCUMENTS

| | | | | |
|---|---|---|---|---|
| 6,794,798 B2* | 9/2004 | Watanabe | | H04R 5/02 |
| | | | | 310/334 |
| 6,859,219 B1* | 2/2005 | Sall | | G06F 1/1683 |
| | | | | 345/905 |
| 6,931,265 B2* | 8/2005 | Reyes | | H04M 1/0247 |
| | | | | 345/173 |
| 7,061,754 B2* | 6/2006 | Moscovitch | | G06F 1/1632 |
| | | | | 361/679.21 |
| 7,375,954 B2* | 5/2008 | Yang | | G06F 1/1622 |
| | | | | 248/920 |
| 7,752,789 B2* | 7/2010 | Sun | | F16M 11/045 |
| | | | | 211/151 |
| D630,204 S * | 1/2011 | Kovac | | D14/327 |
| D630,205 S * | 1/2011 | Kovac | | D14/327 |
| D630,206 S * | 1/2011 | Kovac | | D14/327 |
| D630,628 S * | 1/2011 | Kovac | | D14/327 |
| 7,936,558 B2* | 5/2011 | Chang | | G06F 1/1616 |
| | | | | 361/679.04 |
| 7,991,442 B2* | 8/2011 | Kim | | G06F 1/1624 |
| | | | | 455/575.4 |
| 8,018,715 B2* | 9/2011 | Chang | | G06F 1/1647 |
| | | | | 361/679.04 |
| 8,054,618 B2* | 11/2011 | Sassounian | | G06F 1/1632 |
| | | | | 361/679.55 |
| 8,243,471 B2* | 8/2012 | Liang | | G06F 1/1607 |
| | | | | 361/810 |
| 8,253,648 B2* | 8/2012 | Nagai | | G02F 1/13336 |
| | | | | 345/169 |
| 8,473,853 B2* | 6/2013 | Gage | | G06F 3/0488 |
| | | | | 345/1.3 |
| 8,833,716 B2* | 9/2014 | Funk | | F16M 13/022 |
| | | | | 248/316.4 |
| 9,030,812 B2* | 5/2015 | Nakamura | | H05K 7/16 |
| | | | | 361/679.04 |
| 9,441,782 B2* | 9/2016 | Funk | | F16M 13/00 |
| 10,082,832 B1* | 9/2018 | Wang | | G06F 1/1681 |
| 10,809,762 B1* | 10/2020 | Levine | | G06F 1/1607 |
| 10,871,801 B2* | 12/2020 | Yao | | G06F 1/1649 |
| D938,436 S * | 12/2021 | Gu | | D14/448 |
| D956,752 S * | 7/2022 | Wang | | D14/373 |
| D960,887 S * | 8/2022 | Levine | | G06F 1/1616 |
| | | | | D14/371 |
| 11,416,024 B2* | 8/2022 | Bryant | | G06F 1/1632 |
| 11,537,168 B2* | 12/2022 | Yang | | G06F 1/1654 |
| 11,573,596 B2* | 2/2023 | Levine | | G06F 1/1607 |
| D980,218 S * | 3/2023 | Yao | | D14/373 |
| 11,815,953 B2* | 11/2023 | Yao | | G06F 1/1649 |
| 2003/0095373 A1* | 5/2003 | Duquette | | G06F 1/1683 |
| | | | | 361/679.04 |
| 2005/0253775 A1* | 11/2005 | Stewart | | G06F 1/1616 |
| | | | | 345/1.1 |
| 2006/0082518 A1* | 4/2006 | Ram | | G06F 1/1675 |
| | | | | 345/1.1 |
| 2008/0198096 A1* | 8/2008 | Jung | | G09G 3/20 |
| | | | | 345/1.3 |
| 2009/0102744 A1* | 4/2009 | Ram | | G06F 1/1679 |
| | | | | 345/1.1 |
| 2011/0216482 A1* | 9/2011 | Moscovitch | | G06F 1/1656 |
| | | | | 361/679.01 |
| 2013/0092805 A1* | 4/2013 | Funk | | F16M 13/00 |
| | | | | 248/274.1 |
| 2013/0277520 A1* | 10/2013 | Funk | | G06F 1/1626 |
| | | | | 248/274.1 |
| 2015/0138711 A1* | 5/2015 | Relf | | G06F 1/1647 |
| | | | | 211/26 |
| 2015/0212546 A1* | 7/2015 | Ram | | G06F 1/162 |
| | | | | 361/679.01 |
| 2016/0154434 A1* | 6/2016 | Lakhani | | G06F 1/1632 |
| | | | | 29/592.1 |
| 2022/0253101 A1* | 8/2022 | Atias | | F16M 11/14 |
| 2022/0390982 A1* | 12/2022 | Levine | | G06F 1/1632 |

* cited by examiner

PORTABLE DISPLAY DEVICE

TECHNICAL FIELD

The disclosure relates to the technical field of displays, in particular to a portable display device.

BACKGROUND

Laptops are widely used electronic products for mobile office workers due to their relatively compact sizes, offering convenience for users to carry in a space-saving manner.

As technology continues to advance, due to the needs of business or the consideration of the working efficiency, users usually connect an extended display to the laptop. Currently, the extended display is usually a single-screen with a unidirectional structure which includes a mounting plate and a display body fixed at one end of the mounting plate. The mounting plate is usually installed on the rear wall of the display of a laptop by magnetic attraction. With this structure, the display body may be fixed, but only at one end of the display of the laptop, failing to accommodate the varied usage habits of different users.

SUMMARY

In order to overcome the shortcomings of the prior art, the disclosure provides a portable display device allowing users to install the display body according to their own usage habits, which accommodates the varied usage habits of different users.

The technical scheme adopted by the disclosure to solve the technical problems is described below.

A portable display device comprises a clamping mechanism and a display body, wherein the clamping mechanism comprises a bracket, a left mounting member, a left connecting member connected with an end of the left mounting member, a right mounting member, and a right connecting member connected with an end of the right mounting member. The left end and the right end of the bracket are respectively provided with a mounting cavity, the left mounting member and the right mounting member are respectively arranged in the corresponding mounting cavity, and the left connecting member and the right connecting member are respectively located on the left side and the right side of the bracket. The front outer walls of the left connecting member and the right connecting member are respectively provided with a left L-shaped clamping element and a right L-shaped clamping element, which are symmetrically arranged, the left L-shaped clamping element is used for clamping with an upper and left portion of the display of a laptop, and the right L-shaped clamping element is used for clamping with an upper and right portion of the display of the laptop. An upper end of the bracket, an end of the left connecting member away from the bracket and an end of the right connecting member away from the bracket are respectively provided with a slot, and the lower end, the right end and the left end of the display body are respectively provided with an insert subassembly corresponding to the slot at the upper end of the bracket, the slot at the end of the left connecting member and the slot at the end of the right connecting member, and the insert subassembly is used for inserting into and matching with the corresponding slot.

According to some embodiments, both the left mounting member and the right mounting member are slidable relative to the bracket in a direction proximate to or away from a center of the bracket.

According to some embodiments, an end of the left mounting member away from the left connecting member is provided with a left accommodating groove, and an end of the right mounting member away from the right connecting member is provided with a right accommodating groove. A left guide rail is accommodated in the left accommodating groove, and an end of the left guide rail away from the left connecting member extends out of the left accommodating groove and is arranged at the bottom of the corresponding mounting cavity; a right guide rail is accommodated in the right accommodating groove, and an end of the right guide rail away from the right connecting member extends out of the right accommodating groove and is arranged at the bottom of the corresponding mounting cavity. The left mounting member is slidable along the left guide rail, and the right mounting member is slidable along the right guide rail.

According to some embodiments, the left guide rail is sleeved with a left elastic member, an end of which is connected with the inner wall of the opening end of the left accommodating groove, and the other end is connected with an end of the left guide rail proximate to the left connecting member; the right guide rail is sleeved with a right elastic member, an end of which is connected with the inner wall of the opening end of the right accommodating groove, and the other end is connected with an end of the right guide rail proximate to the right connecting member.

According to some embodiments, the insert subassembly comprises a fixed member and a movable member, wherein the left end, the right end and the lower end of the display body are respectively provided with a mounting groove, the mounting groove extends to the rear outer wall of the display body, and each mounting groove corresponds to one insert subassembly. The fixed member is arranged in a corresponding mounting groove, the movable member extends into the corresponding mounting groove and is hinged with the fixed member, and the movable member is used for inserting into and matching with the corresponding slot.

According to some embodiments, the clamping mechanism further comprises a left locking assembly, a right locking assembly and an upper locking assembly, wherein the left locking assembly, the right locking assembly and the upper locking assembly all comprise a push button, an extension plate, a connecting column and an elastic reset member. The front inner walls of the slot of the left connecting member, the right connecting member and the bracket are provided with a left accommodating position, a right accommodating position and an upper accommodating position, respectively. The movable member is provided with a hole, an end of the movable member away from the fixed member is provided with an opening, and the hole is located between the opening and the fixed member. In the left locking assembly, the push button is arranged in a through hole of the rear side outer wall of the left connecting member and can be pressed, a first end of the push button is located outside the left connecting member, a second end of the push button passes through the slot of the left connecting member and extends to the left accommodating position and is sleeved with the extension plate, and an end of the connecting column is arranged on the front inner wall of the left connecting member, the other end of the connecting column is accommodated at the left accommodating position and in the mounting groove of the second end of the push button, the elastic reset member is sleeved on the periphery of the connecting column, a first end of the elastic reset member is connected with the bottom of the mounting groove, and a second end of the elastic reset member is connected with an end of the connecting column proximate to the front inner wall of the left connecting member. The extension plate is provided with a limiting block, and the limiting block is located in the slot of the left connecting member and is restricted by the hole of a corresponding movable member. In the right locking assembly, the push button is arranged in a through hole of the rear side outer wall of the right connecting member and may be pressed down, a first end of the push button is located outside the right connecting member, a second end of the push button passes through the slot of the right connecting member and extends to the right accommodating position and is sleeved with the extension plate, and an end of the connecting column is arranged on the front inner wall of the right connecting member. The other end of the connecting column is accommodated at the right accommodating position and in the mounting groove of the second end of the push button, the elastic reset member is sleeved on the periphery of the connecting column, a first end of the elastic reset member is connected with the bottom of the mounting groove, and a second end of the elastic reset member is connected with an end of the connecting column proximate to the front inner wall of the right connecting member. The extension plate is provided with a limiting block, and the limiting block is located in the slot of the right connecting member and restricted by the hole of the corresponding movable member. In the upper locking assembly, the push button is arranged in a through hole of the outer wall of the rear side of the bracket and may be pressed down, a first end of the push button is located outside the bracket, a second end of the push button passes through the slot of the bracket and extends to the upper accommodating position and is sleeved with the extension plate. An end of the connecting column is arranged on the front inner wall of the bracket, and the other end of the connecting column is accommodated at the upper accommodating position and in the mounting groove of the second end of the push button. The elastic reset member is sleeved on the periphery of the connecting column. A first end of the elastic reset member is connected with the bottom of the mounting groove, and a second end of the elastic reset member is connected with an end of the connecting column proximate to the front inner wall of the bracket. The extension plate is provided with a limiting block, which is located in the slot of the bracket and restricted by the hole of the corresponding movable member.

According to some embodiments, the left L-shaped clamping element and the right L-shaped clamping element are respectively provided with a left clamping portion and a right clamping portion which are oppositely arranged. The left clamping portion is used for clamping with the left end of the front outer wall of the display of the laptop, and the right clamping portion is used for clamping with the right end of the front outer wall of the display of the laptop.

According to some embodiments, the clamping mechanism further comprises a supporting assembly, which includes a sliding member, a first supporting plate, a second supporting plate and a third supporting plate, wherein a lower end of the bracket is provided with a supporting cavity, a sliding member is arranged in the supporting cavity, a length direction of the sliding member is parallel to a depth direction of the supporting cavity, the first supporting plate and the second supporting plate are located at the same side of the sliding member, and the first supporting plate is slidably connected to the sliding member. The second supporting plate is hinged with the first supporting plate, and the third supporting plate is slidably connected to the second supporting plate, an end of the third supporting plate away from the first supporting plate is folded or in a curve shape and located in the opening end of the supporting cavity. The first supporting plate is slidable along the length of the sliding member, and the third supporting plate is slidable along the length of the second supporting plate.

According to some embodiments, the supporting assembly further comprises a sliding button and a movable locking member, wherein a lower end of the bracket is provided with a mounting groove on one side of the supporting cavity, the bottom of the mounting groove is provided with an accommodating cavity communicating with the supporting cavity, the movable locking member is arranged in the accommodating cavity, the sliding button is arranged in the mounting groove and partially extends into the accommodating cavity and is connected with the movable locking member. An end of the movable locking member proximate to the supporting cavity is used to extend into the supporting cavity and engage with a recessed portion of the third supporting plate; an end of the movable locking member away from the supporting cavity is connected with the inner wall of an end of the accommodating cavity away from the supporting cavity through an elastic connecting member; and the sliding button is slidable in a direction proximate to or away from the supporting cavity in the mounting groove, such that the sliding of the sliding button can drive the movable locking member to move in the direction proximate to or away from the supporting cavity.

According to some embodiments, the number of the display body is selected from one of one, two or three.

By providing (three) slots respectively arranged at the upper end of the bracket, the end of the left connecting member away from the bracket and the end of the right connecting member away from the bracket, and three insert subassemblies corresponding to the three slots at the lower end, the right end and the left end of the display body, the disclosure has the following benefits: by inserting and matching the insert subassembly with the corresponding slot, users can install the display body according to their own usage habits, which can accommodate the varied usage habits of different users, and it is convenient to assemble and disassemble the display device by clamping a display of a laptop with left and right L-shaped clamping elements and by matching the insert subassembly with the corresponding slot. It is convenient to carry the clamping mechanism and the display body.

BRIEF DESCRIPTION OF THE DRAWINGS

The disclosure will be further explained with the attached drawings and embodiments.

DETAILED DESCRIPTION

The concepts, specific structures and technical effects of this disclosure will be described clearly and completely with embodiments and drawings, so as to fully explain the purposes, characteristics and effects of this disclosure. It should be appreciated that the described embodiments are only some of the embodiments of the disclosure. Based on the embodiments of the disclosure, other embodiments obtained by those skilled in the art without paying creative labors are included in the protection scope of the disclosure. In addition, all the connecting/connection relationships involved in the disclosure do not mean that members are directly connected, but that a better connection structure can be formed between two members by adding or reducing connection accessories according to specific implementation conditions. All the technical features in the disclosure can be combined interactively on the premise of not contradicting with each other.

Figure 1:
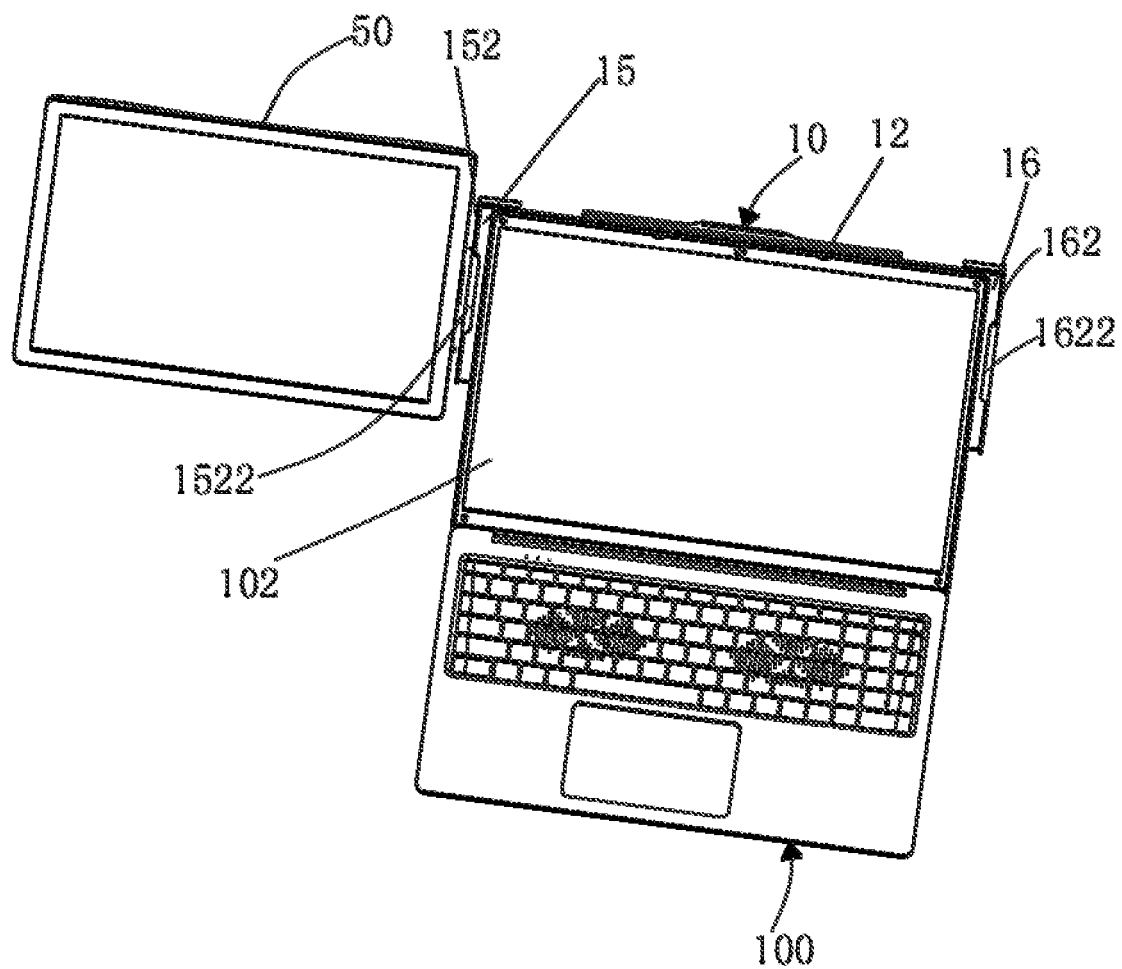
FIG. 1 is a schematic structural diagram of the front side of a portable display device according to an embodiment of the disclosure.
Figure 2:
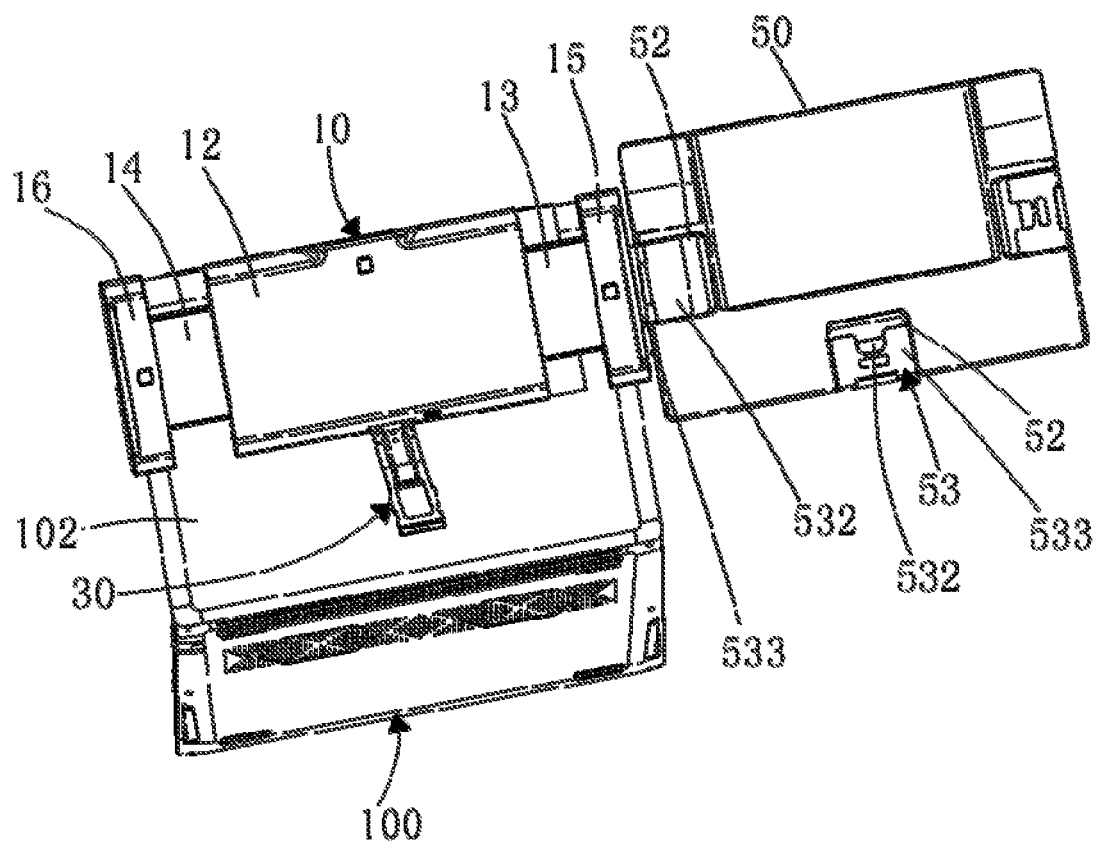
FIG. 2 is a schematic structural view of the rear side of the portable display device according to FIG. 1.
Figure 3:
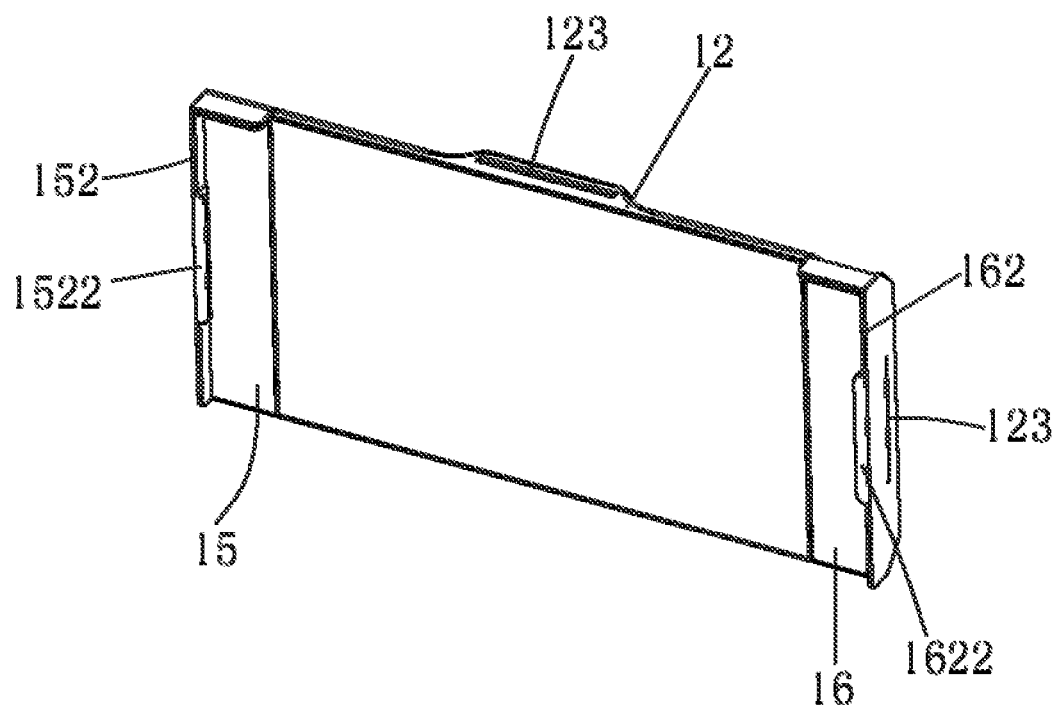
FIG. 3 is a schematic structural view of the front side of the clamping mechanism of the portable display device according to FIG. 1.
Figure 4:
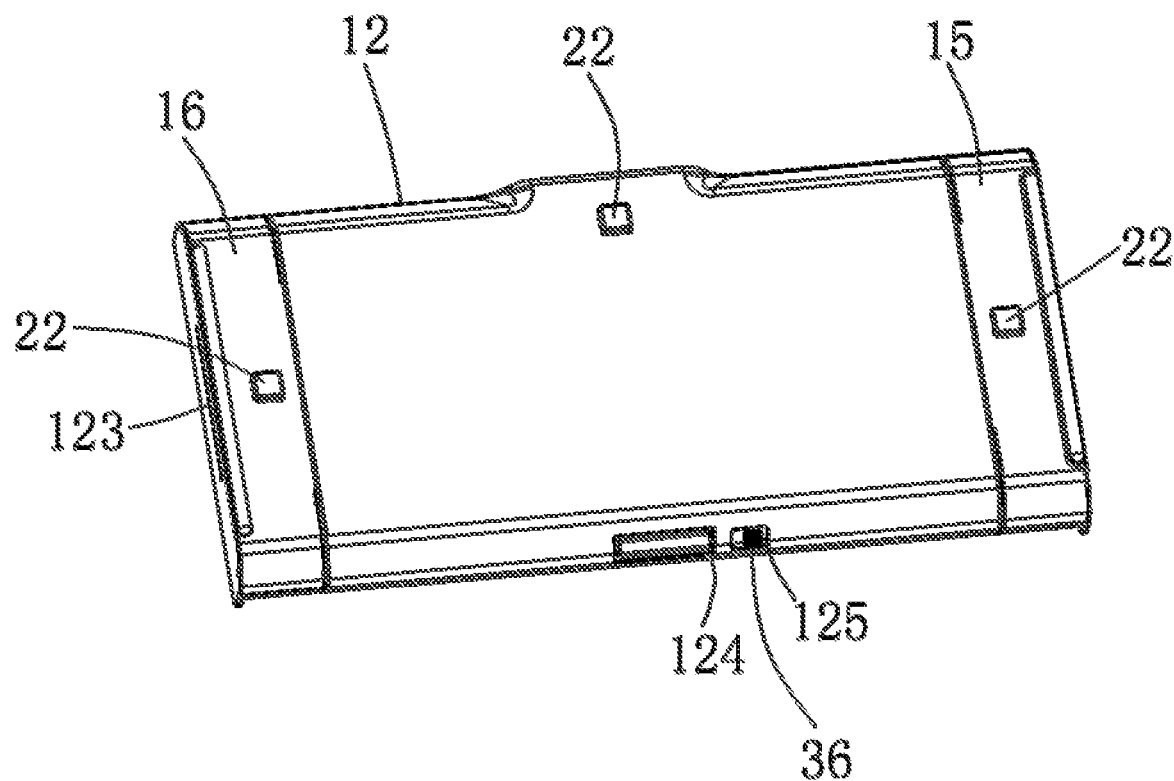
FIG. 4 is a schematic structural view of the rear side of the clamping mechanism according to FIG. 3.

Referring to FIG. 1 and FIG. 2, a portable display device includes a clamping mechanism 10 and a display body 50 according to an embodiment of the disclosure.

Referring to FIG. 3 to FIG. 7, the clamping mechanism 10 includes a bracket 12, a left mounting member 13, a left connecting member 15 connected with an end of the left mounting member 13, a right mounting member 14, and a right connecting member 16 connected with an end of the right mounting member 14. The left end and the right end of the bracket 12 are respectively provided with a mounting cavity 122, and the left mounting member 13 and the right mounting member 14 are respectively arranged in the mounting cavities 122. The left connecting member 15 and the right connecting member 16 are respectively located on the left side and the right side of the bracket 12. A display 102 of a laptop 100 is configured to be in contact with a front outer wall of the left connecting member 15, a front outer wall of the right connecting member 16 and a front outer wall of the bracket 12. The front outer walls of the left connecting member 15 and the right connecting member 16 are respectively provided with a left L-shaped clamping element 152 and a right L-shaped clamping element 162, which are symmetrically arranged left and right. The left L-shaped clamping element 152 is used to clamp an upper and left portion of the display 102 of the laptop 100, and the right L-shaped clamping element 162 is used to clamp an upper and right portion of the display 102 of the laptop 100. The upper end of the bracket 12, the end of the left connecting member 15 away from the bracket 12 and the end of the right connecting member away from the bracket are respectively provided with a slot 123, and the lower end, right end and left end of the display body 50 are respectively provided with an insert subassembly 53 corresponding to the slot 123. That is, the insert subassembly 53 at the lower end of the display body 50 corresponds to the slot 123 at the upper end of the bracket 12, the insert subassembly 53 at the right end of the display body 50 corresponds to the slot 123 of the left connecting member 15, and the insert subassembly 53 at the left end of the display body 50 corresponds to the slot 123 of the right connecting member 16. That is, the insert subassembly 53 is used for inserting into and matching with a corresponding slot 123.

With the above structure, in practical application, firstly, the left L-shaped clamping element 152 of the clamping mechanism 10 clamps the upper and left portion of the display 102 of the laptop 100, and the right L-shaped clamping element 162 clamps the upper and right portion of the display 102 of the laptop 100. Next, the insert subassembly 53 at the right end of the display body 50 is inserted into the slot 123 of the left connecting member 15 of the clamping mechanism 10. In this way, the display body 50 is attached to the left end of the display 102 of the laptop 100. If the insert subassembly 53 at the left end of the display body 50 is inserted into the slot 123 of the right connecting member 16 of the clamping mechanism 10, the display body 50 can be attached to the right end of the display 102 of the laptop 100. If the insert subassembly 53 at the lower end of the display body 50 is inserted into the slot 123 of the bracket 12 of the clamping mechanism 10, the display body 50 is attached to the upper end of the display 102 of the laptop 100. The display body 50 can be installed to the left end of the display 102 of the laptop 100 by matching the insert subassembly 53 at the right end of the display body 50 with the slot 123 of the left connecting member 15. In some embodiments, by matching the insert subassembly 53 of the left end of the display body 50 with the slot 123 of the right connecting member 16, the display body 50 is attached to the right end of the display 102 of the laptop 100. In some embodiments, by inserting the insert subassembly 53 at the lower end of the display body 50 into the slot 123 of the bracket 12, the display body 50 can be attached to the upper end of the display 102 of the laptop 100. In this way, users can install the display body 50 according to their usage habits, which can accommodate the varied usage habits of different users. In addition, the left L-shaped clamping element 152 and the right L-shaped clamping element 162 clamp the display 102 of the laptop 100, and the insert subassembly 53 is inserted into and matched with the corresponding slot 123, so that the clamping mechanism 10 and the display body 50 are convenient to be assembled and disassembled, which facilitates the storage of the clamping mechanism 10 and the display body 50.

In this embodiment, a vertical part of the left L-shaped clamping element 152 is used to engage with the left end of the display 102 of the laptop 100, and arranged at the end of the front outer wall of the left connecting member 15 away from the bracket 12. A horizontal part of the left L-shaped clamping element 152 is used to engage with the upper end of the display 102 of the laptop 100, and arranged at the upper end of the front outer wall of the left connecting member 15. A vertical part of the right L-shaped clamping element 162 is used to engage with the right end of the display 102 of the laptop 100, and arranged at the end of the front outer wall of the right connecting member 16 away from the bracket 12. A horizontal part of the right L-shaped clamping element 162 is used to engage with the upper end of the display 102 of the laptop 100, and arranged at the upper end of the front outer wall of the right connecting member 16.

The vertical part of the left L-shaped clamping element 152 and the vertical part of the right L-shaped clamping element 162 are respectively provided with a left clamping portion 1522 and a right clamping portion 1622, which are oppositely arranged left and right. The left clamping portion 1522 is used for clamping with the left end of the display 102 of the laptop 100, and the right clamping portion 1622 is used for clamping with the right end of the display 102 of the laptop 100. The left clamping portion 1522 and the right clamping portion 1622 can ensure that the front outer wall of the left connecting member 15, the front outer wall of the right connecting member 16 and the front outer wall of the bracket 12 are attached to the rear outer wall of the display 102 of the laptop 100.

Figure 5:
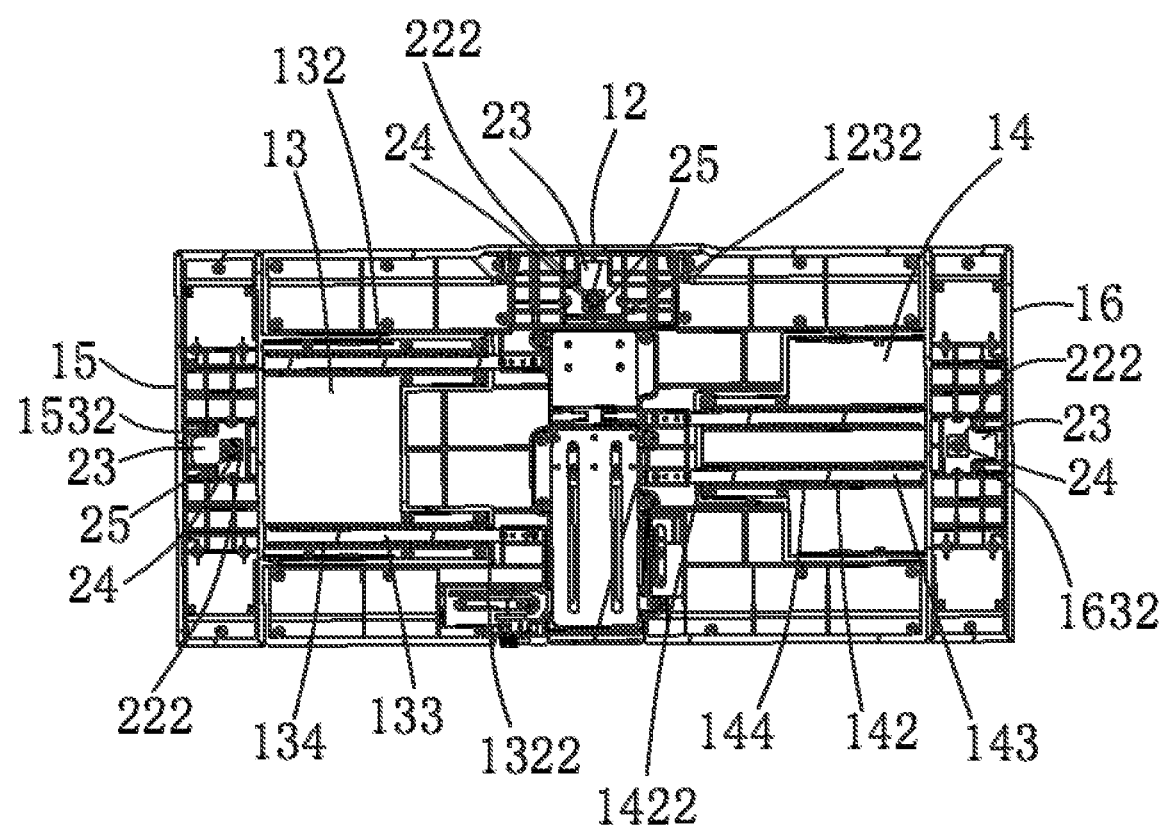
FIG. 5 is a schematic sectional view of the clamping mechanism according to FIG. 3.
Figure 6:
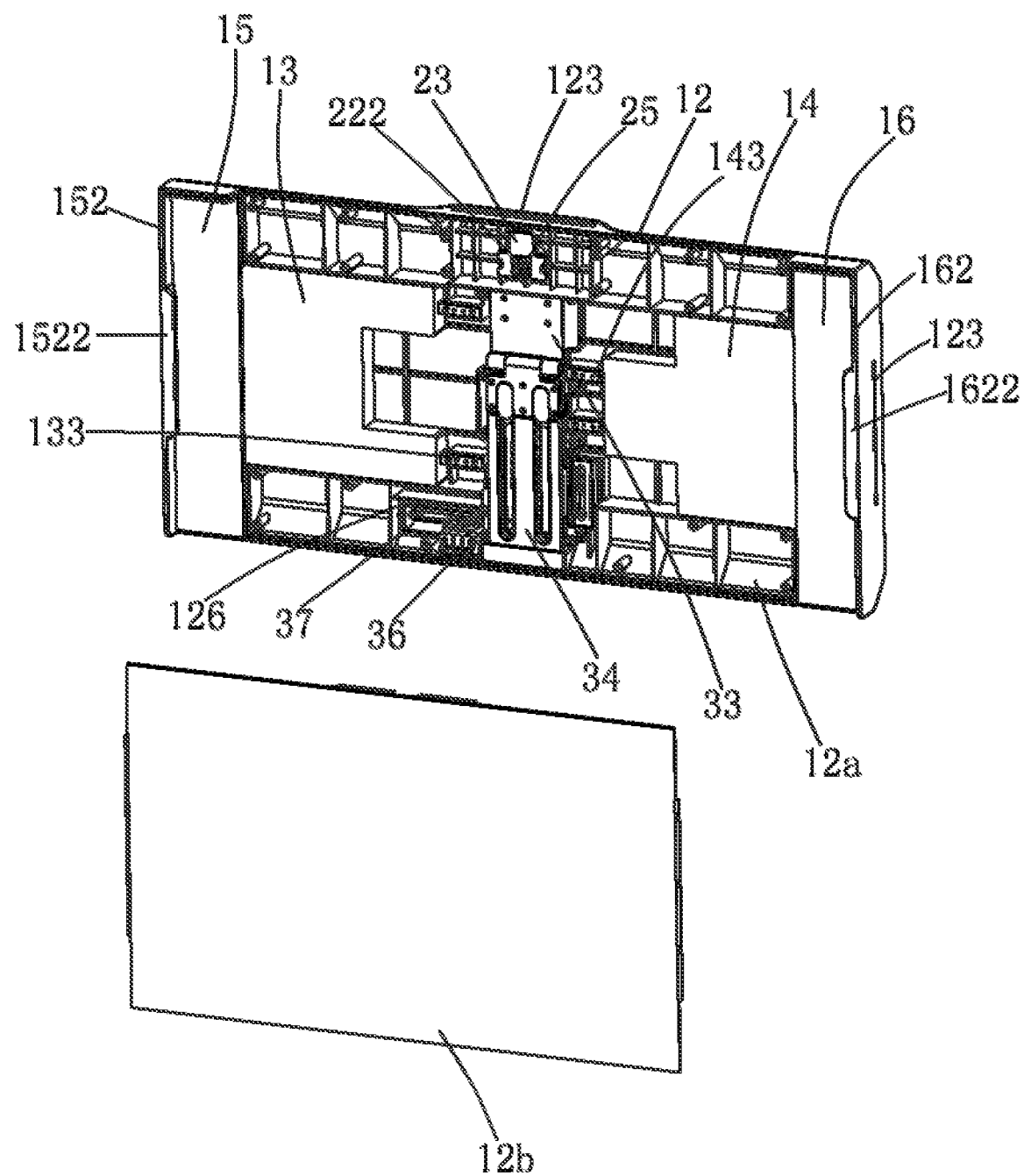
FIG. 6 is an exploded schematic view of the clamping mechanism according to FIG. 3.

In this embodiment, as shown in FIG. 5 and FIG. 6, the bracket 12 includes a rear bracket shell 12a and a front bracket shell 12b arranged at the front side of the bracket rear shell 12a.

In this embodiment, both the left mounting member 13 and the right mounting member 14 are slidable relative to the bracket 12 in a direction proximate to or away from a center of the bracket 12. In practical application, when the width of the display 102 of the laptop 100 is larger than the distance between the left L-shaped clamping element 152 and the right L-shaped clamping element 162, the left connecting member 15 and/or the right connecting member 16 are manually pulled away from the center of the bracket 12, so that the left mounting member 13 and the right mounting member 14 can be driven to slide away from the center of the bracket 12, which can increase the distance between the left L-shaped clamping element 152 and the right L-shaped clamping element 162. Next, the left L-shaped clamping element 152 clamps the upper and left portion of the display 102 of the laptop 100, and the right L-shaped clamping element 162 clamps the upper and right portion of the display 102 of the laptop 100, as shown in FIG. 1 and FIG. 2. With this structure, the portable display device according to the disclosure can be installed on the display 102 of laptop 100 with different sizes, which can apply to a wide range of laptop 100 with different sizes.

An end of the left mounting member 13 away from the left connecting member 15 is provided with a left accommodating groove 132 (refer to FIG. 5 and FIG. 7), and an end of the right mounting member 14 away from the right connecting member 16 is provided with a right accommodating groove 142 (refer to FIG. 5). A left guide rail 133 is accommodated in the left accommodating groove 132, an end of the left guide rail 133 away from the left connecting member 15 extends out of the left accommodating groove 132 and is arranged at the bottom of a corresponding mounting cavity 122 (i.e., the mounting cavity 122 arranged at the left end of the bracket 12), and a right guide rail 143 is accommodated in a right accommodating groove 142, and an end of the right guide rail 143 away from the right connecting member 16 extends out of the right accommodating groove 142 and is arranged at the bottom of a corresponding mounting cavity 122 (the mounting cavity arranged at the right end of the bracket 12). The left mounting member 13 is slidable along the left guide rail 133, and the right mounting member 14 is slidable along the right guide rail 143. The left guide rail 133 and the right guide rail 143 together play a guiding role in the sliding of the left mounting member 13 and the right mounting member 14, and can improve the moving stability of the left mounting member 13 and the right mounting member 14.

A left elastic member 134 is sleeved on the periphery of the left guide rail 133, and an annular protrusion 1322 (refer to FIG. 5) is formed on the inner wall of an opening end of the left accommodating groove 132. An end of the left elastic member 134 is connected with the protrusion 1322 at the opening end of the left accommodating groove 132, and the other end of the left elastic member 134 is connected with an end of the left guide rail 133 proximate to the left connecting member 15. A right elastic member 144 is sleeved on the outer periphery of the right guide rail 143, and an annular protrusion 1422 (refer to FIG. 5) is formed on the inner wall of an opening end of the right accommodating groove 142. An end of the right elastic member 144 is connected with the protrusion 1422 at the opening end of the right accommodating groove 142, and the other end of the right elastic member 144 is connected with an end of the right guide rail 143 proximate to the right connecting member 16. The left elastic member 134 and the right elastic member 144 are preferably springs. When the left connecting member 15 and the right connecting member 16 are manually pulled away from the center of the bracket 12, the left mounting member 13 and the right mounting member 14 can be driven to slide away from the center of the bracket 12. At this time, the left elastic member 134 and the right elastic member 144 are compressed. When the left connecting member 15 and the right connecting member 16 are released, the left mounting member 13, the left connecting member 15, the right mounting member 14 and the right connecting member 16 can be driven to move towards the center of the bracket 12 to return to their initial position by the reset action of the left elastic member 134 and the right elastic member 144.

In some embodiments, there are two left accommodating grooves 132 and two right accommodating grooves 142, two left accommodating grooves 132 are arranged side by side along the width of the left mounting member 13, and two right accommodating grooves 142 are arranged side by side along the width of the right mounting member 14. The number of the left guide rail 133, the left elastic member 134, the right guide rail 143 and the right elastic member 144 respectively corresponds to the number of the left accommodating groove 132 and the right accommodating groove 142, e.g., two. It should be appreciated that the number of the left accommodating groove 132, the right accommodating groove 142, the left guide rail 133, the left elastic member 134, the right guide rail 143 and the right elastic member 144 can be adjusted according to the actual situation.

Figure 9:
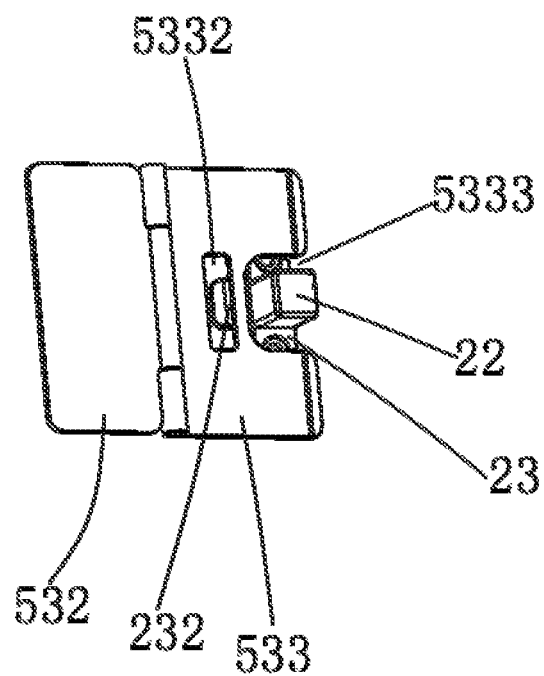
FIG. 9 is a schematic structural view of the insert subassembly at the left end and a push button and an extension plate of a left locking assembly of the display body of the portable display device according to FIG. 1.

In this embodiment, as shown in FIG. 9, the insert subassembly 53 includes a fixed member 532 and a movable member 533. The left end, the right end and the lower end of the display body 50 are respectively provided with mounting grooves 52 which extend to the rear outer wall of the display body 50, and each mounting groove 52 corresponds to one insert subassembly 53. The fixed member 532 is arranged in the corresponding mounting groove 52, and the movable member 533 is located outside the corresponding mounting groove 52. An end of the movable member 533 is arranged inside the corresponding mounting groove 52 and is hinged with the fixed member 532 through a hinge shaft, so that the movable member 533 is rotatable relative to the fixed member 532, and the movable member 533 is used for inserting into and matching with the corresponding slot 123. Since the mounting groove 52 extends to the rear outer wall of the display body 50, when the display body 50 is not in use, the movable member 533 may be rotated, relative to the fixed member 532, to a position where it can be accommodated in the corresponding mounting groove 52, which can reduce the volume occupied by the display body 50, reduce the occupied space and facilitate the storage of the display body 50. When the display body 50 is in use, the movable member 533 may be rotated such that an included angle of about 180 degrees between the movable member 533 and the fixed member 532 is provided, as shown in FIG. 2.

Further, as shown in FIG. 9, the movable member 533 is provided with a hole 5332, an end of the movable member 533 away from the fixed member 532 is provided with an opening 5333, and the hole 5332 is located between the opening 5333 and the fixed member 532.

The clamping mechanism 10 also includes a left locking assembly, a right locking assembly and an upper locking assembly. Each of the left locking assembly, the right locking assembly and the upper locking assembly includes a push button 22, an extension plate 23, a connecting column 24 and an elastic reset member 25. The push button 22 has a first end and a second end which are opposite to each other, and the second end of the push button 22 is provided with a mounting groove 222, as shown in FIG. 5. The elastic reset member 25 is preferably a spring.

As shown in FIG. 5, the front inner walls of the slots 123 of the left connecting member 15, the right connecting member 16 and the bracket 12 are respectively provided with a left accommodating position 1532, a right accommodating position 1632 and an upper accommodating position 1232. The shapes of the left accommodating position 1532, the right accommodating position 1632 and the upper accommodating position 1232 are adapted to the extension plate 23. The front inner wall of the slot 123 refers to the inner wall of the slot 123 proximate to the front inner wall of the bracket 12. The extension plate 23 of the left locking assembly is accommodated in the left accommodating position 1532, the extension plate 23 of the right locking assembly is accommodated in the right accommodating position 1632, and the extension plate 23 of the upper locking assembly is accommodated in the upper accommodating position 1232.

In the left locking assembly, the rear outer wall of the left connecting member 15 is provided with a through hole, which communicates with the slot 123 at the end of the left connecting member 15 away from the bracket 12, and the push button 22 is arranged in the through hole of the outer wall of the rear side of the left connecting member 15 and may be pressed down. The first end of the push button 22 is located outside the left connecting member 15, and the second end of the push button 22 passes through the slot 123 of the left connecting member 15 and extends to the left accommodating position 1532 and is sleeved with the extension plate 23. An end of the connecting column 24 is arranged on the front inner wall of the left connecting member 15, and the other end of the connecting column 24 is accommodated in the left accommodation position 1532 and the mounting groove 222 of the second end of the push button 22. The elastic reset member 25 is sleeved on the outer periphery of the connecting column 24, the first end of the elastic reset member 25 is connected with the bottom of the mounting groove 22, and the second end of the elastic reset member 25 is connected with an end of the connecting column 24 proximate to the front inner wall of the left connecting member 15. A side of the extension plate 23 proximate to the first end of the push button 22 is provided with a limiting block 232, and the limiting block 232 is located in the slot 123 of the left connecting member 15. In practical application, when the movable member 533 at the right end of the display body 50 is inserted into the slot 123 of the left connecting member 15, the limiting block 232 will be pushed by the movable member 533 to push the extension plate 23 to move towards the front inner wall of the left connecting member 15, thereby driving the push button 22 to move toward the front inner wall of the left connecting member 15. At this time, the elastic reset member 25 will be compressed. When the end of the movable member 533 away from the fixed member 532 abuts against the bottom of the slot 123, the movable member 533 is inserted in place. At this time, the hole 5332 of the movable member 533 corresponds to/matches with the limiting block 232, and the push button 22 is located in the opening of the movable member 533, as shown in FIG. 9. Since the limiting block 232 is not blocked by the movable member 533, under the reset action of the elastic reset member 25, the limiting block 232, the extension plate 23 and the push button 22 can move towards the rear inner wall of the left connector 15 to return to their initial position, and at this time, the limiting block 232 is restricted by the hole 5332, as shown in FIG. 9. In this way, the movable member 533 can be locked in the slot 123 through the limiting block 232, and the movable member 533 cannot be pulled out of the slot 123. When the display body 50 needs to be removed from the left connecting member 15, firstly, the push button 22 is pressed in a direction proximate to the front inner wall of the left connecting member 15, so as to drive the extension plate 23 and the limiting block 232 to move in the direction proximate to the front inner wall of the left connecting member 15. When the extension plate 23 abuts against the front inner wall of the left connecting member 15, the limiting block 232 is disengaged from the hole 5332, thus unlocking is realized. The elastic member 25 can be compressed and the movable member 533 is pulled out of the slot 123, the push button 22 is released, and under the reset action of the elastic reset member 25, the push button 22 and the extension plate 23 can move towards the rear inner wall of the left connecting member 15 to return to their initial position. The connecting column 24 plays a guiding role.

Figure 8:
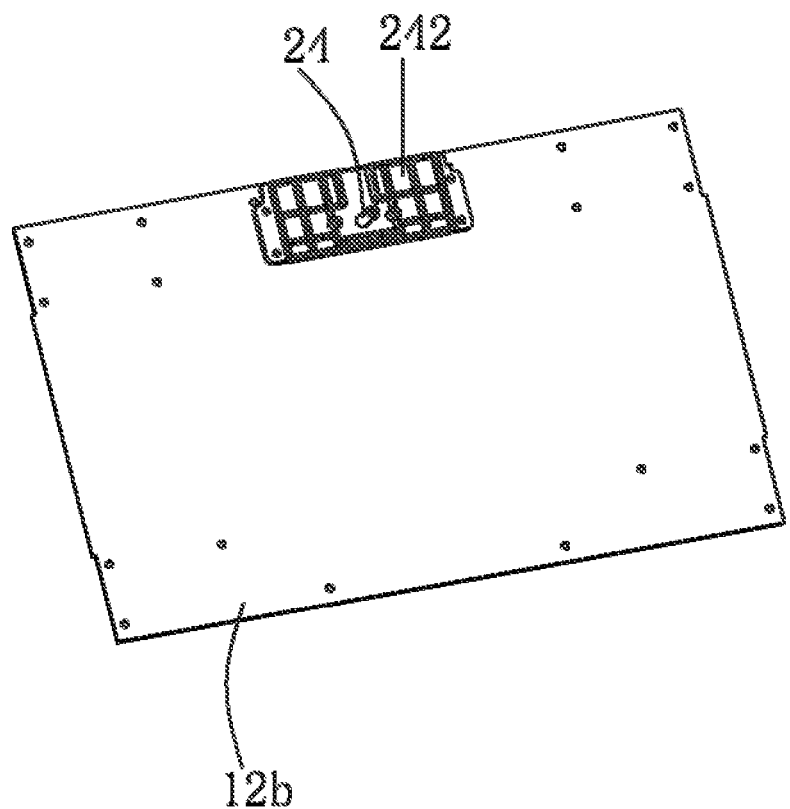
FIG. 8 is a schematic structural view of the front shell of the bracket of the clamping mechanism according to FIG. 3.

In the upper locking assembly, the rear outer wall of the bracket 12 is provided with a through hole, which communicates with a slot 123 arranged at the upper end of the bracket 12, and a push button 22 is arranged in the through hole of the rear outer wall of the bracket 12 and may be pressed down. The first end of the push button 22 is located outside the bracket 12, and the second end of the push button 22 passes through the slot 122 of the bracket 12 and extends to the upper accommodating position 1232 and is sleeved with an extension plate 23. The front inner wall of the bracket 12 is provided with a mounting plate 242 (that is, the inner wall of the front bracket shell 12b is provided with a mounting plate 242). As shown in FIG. 8, an end of the connecting column 24 is arranged on the mounting plate 242, and the other end of the connecting column 24 is accommodated in the upper accommodating position 1232 and the mounting groove 222 at the second end of the push button 22. The elastic reset member 25 is sleeved on the periphery of the connecting column 24, the first end of the elastic reset member 25 is connected with the bottom of the mounting groove 222, and the second end of the elastic reset member 25 is connected with an end of the connecting column 24 proximate to the front inner wall of the bracket 12. A side of the extension plate 23 proximate to the first end of the push button 22 is provided with a limiting block 232, and the limiting block 232 is located in the slot 123 of the bracket 12. In practical application, when the movable member 533 at the lower end of the display body 50 is inserted into the slot 123 of the bracket 12, the limiting block 232 will be pushed by the movable member 533 to push the extension plate 23 to move in a direction proximate to the front inner wall of the bracket 12, thereby driving the push button 22 to move in the direction proximate to the front inner wall of the bracket 12. At this time, the elastic reset member 25 is compressed, when the end of the movable member 533 away from the fixed member 532 abuts against the bottom of the slot 123, it indicates that the movable member 533 has been inserted in place. At this time, the hole 5332 of the movable member 533 corresponds to or matches with the limiting block 232, and the push button 22 is located in the opening 5333 of the movable member 533. As the limiting block 232 is not blocked by the movable member 533, under the reset action of the elastic reset member 25, the limiting block 232, the extension plate 23 and the push button 22 can move in a direction proximate to the rear inner wall of the bracket 12 to return to their initial position. At this time, the limiting block 232 is restricted by the hole 5332, so that the movable member 533 is locked in the slot 123 by the limiting block 232, and the movable member 533 cannot be pulled out from the slot 123. When the display body 50 needs to be removed from the bracket 12, the push button 22 is pressed in a direction proximate to the front inner wall of the bracket 12, so that the extension plate 23 and the limiting block 232 can be driven to move in the direction proximate to the front inner wall of the bracket 12. When the extension plate 23 abuts against the mounting block 242 on the front inner wall of the bracket 12, the limiting block 232 is disengaged from the hole 5332, and the elastic member 25 is compressed, so that the movable member 533 can be pulled out of the slot 123, so that the display body 50 can be removed from the bracket 12. After the movable member 533 is pulled out of the slot 123, the push button 22 is released, and under the reset action of the elastic reset member 25, the push button 22 and the extension plate 23 can move towards the rear inner wall of the bracket 12 to return to their initial position. The connecting column 24 plays a guiding role.

Figure 7:
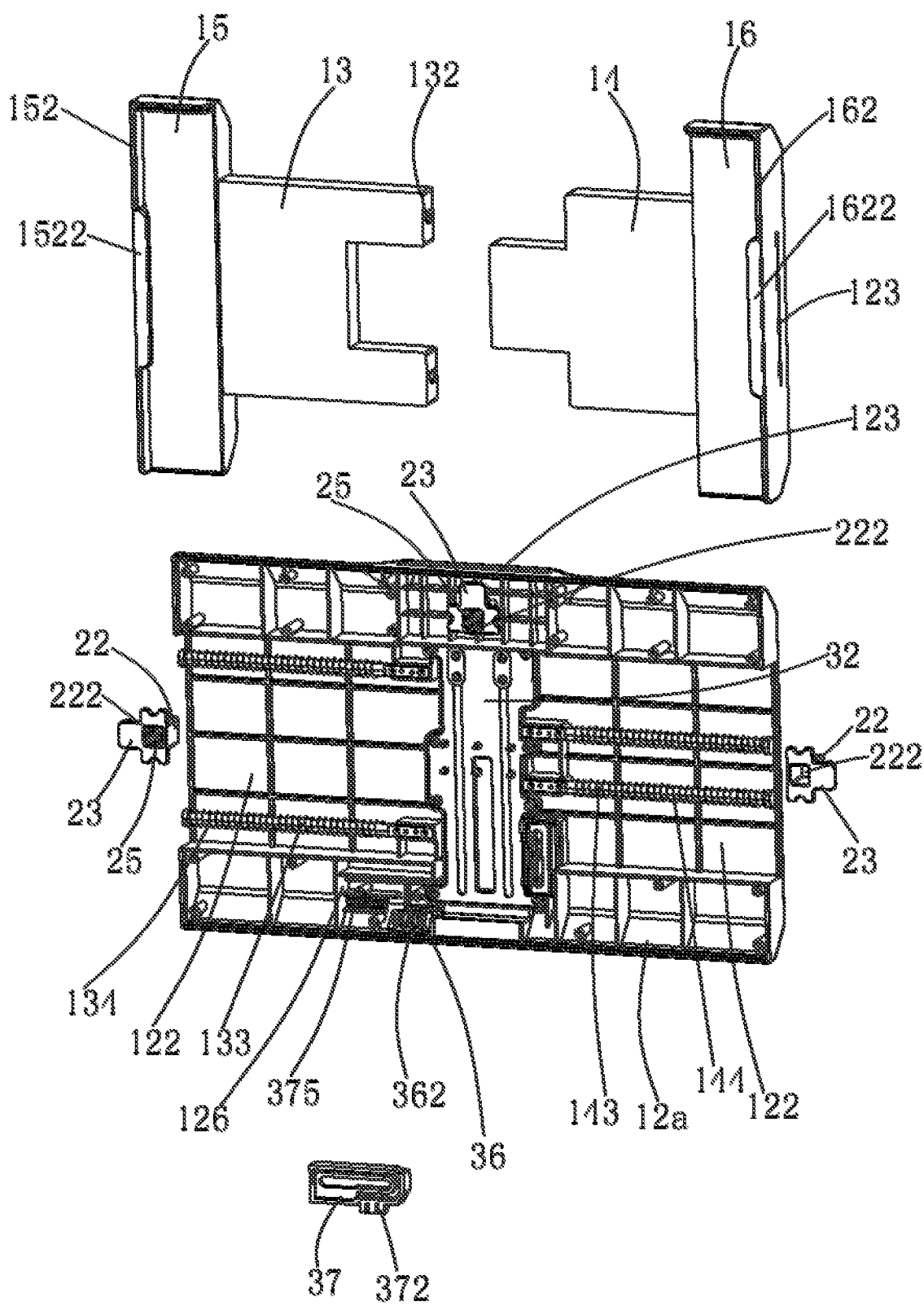
FIG. 7 is an exploded schematic view of the bracket of the clamping mechanism according to FIG. 3, with a front shell of the bracket removed and with a first supporting plate, a second supporting plate and a third supporting plate of the supporting assembly removed.

In the right locking assembly (the elastic reset member of the right locking assembly is not shown in FIG. 7), the rear outer wall of the right connecting member 16 is provided with a through hole, which is connected with the slot 123 at the end of the right connecting member 16 away from the bracket 12, and a push button 22 is arranged in the through hole of the rear outer wall of the right connecting member 16 and can be pressed down, and the first end of the push button 22 is located outside the right connecting member 16, and the second end of the push button 22 passes through the slot 123 of the right connecting member 16 and extends to the right accommodating position 1632 and is sleeved with an extension plate 23. An end of the connecting column 24 is arranged on the front inner wall of the right connecting member 16, and the other end of the connecting column 24 is accommodated in the right accommodation position 1632 and the mounting groove 222 of the second end of the push button 22. The elastic reset member 25 is sleeved on the outer periphery of the connecting column 24, the first end of the elastic reset member 25 is connected with the bottom of the mounting groove 22, and the second end of the elastic reset member 25 is connected with an end of the connecting column 24 proximate to the front inner wall of the right connecting member 16. A side of the extension plate 23 proximate to the first end of the push button 22 is provided with a limiting block 232, and the limiting block 232 is located in the slot 123 of the right connecting member 16. In practical application, when the movable member 533 at the left end of the display body 50 is inserted into the slot 123 of the right connecting member 16, the limiting block 232 will be pushed by the movable member 533 to push the extension plate 23 to move in a direction proximate to the front inner wall of the right connecting member 16, thereby driving the push button 22 to move in the direction proximate to the front inner wall of the right connecting member 16. At this time, the elastic reset member 25 is compressed. When the end of the movable member 533 away from the fixed member 532 abuts against the bottom of the slot 123, the movable member 533 has been inserted in place. At this time, the hole 5332 of the movable member 533 matches with the limiting block 232, and the push button 22 is located in the opening 5333 of the movable member 533. As the limiting block 232 is not blocked by the movable member 533, under the reset action of the elastic reset member 25, the limiting block 232, the extension plate 23 and the push button 22 can move in a direction proximate to the rear inner wall of the right connecting member 16 to return to their initial position. At this time, the limiting block 232 is restricted by the hole 5332, so that the movable member 533 can be locked in the slot 123 through the limiting block 232, and the movable member 533 cannot be pulled out from the slot 123. When the display body 50 needs to be removed from the right connecting member 16, firstly, the push button 22 is pressed in a direction proximate to the front inner wall of the right connecting member 16, so as to drive the extension plate 23 and the limiting block 232 to move in the direction proximate to the front inner wall of the right connecting member 16. When the extension plate 23 abuts against the front inner wall of the right connecting member 16, the limiting block 232 is disengaged from the locking position 5332, so as to realize unlocking, and the elastic reset member 25 is compressed, at this time, the movable member 533 can be pulled out of the slot 123, so that the display body 50 can be removed from the right connecting member 16. After the movable member 533 is pulled out of the slot 123, the push button 22 is released, and under the reset action of the elastic reset member 25, the push button 22 and the extension plate 23 can move towards the rear inner wall of the right connecting member 16 to return to their initial position. The connecting column 24 plays a guiding role.

Preferably, the extension plate 23, the push button 22 and the limiting block 232 are integrally formed, which is convenient for manufacturing.

Figure 10:
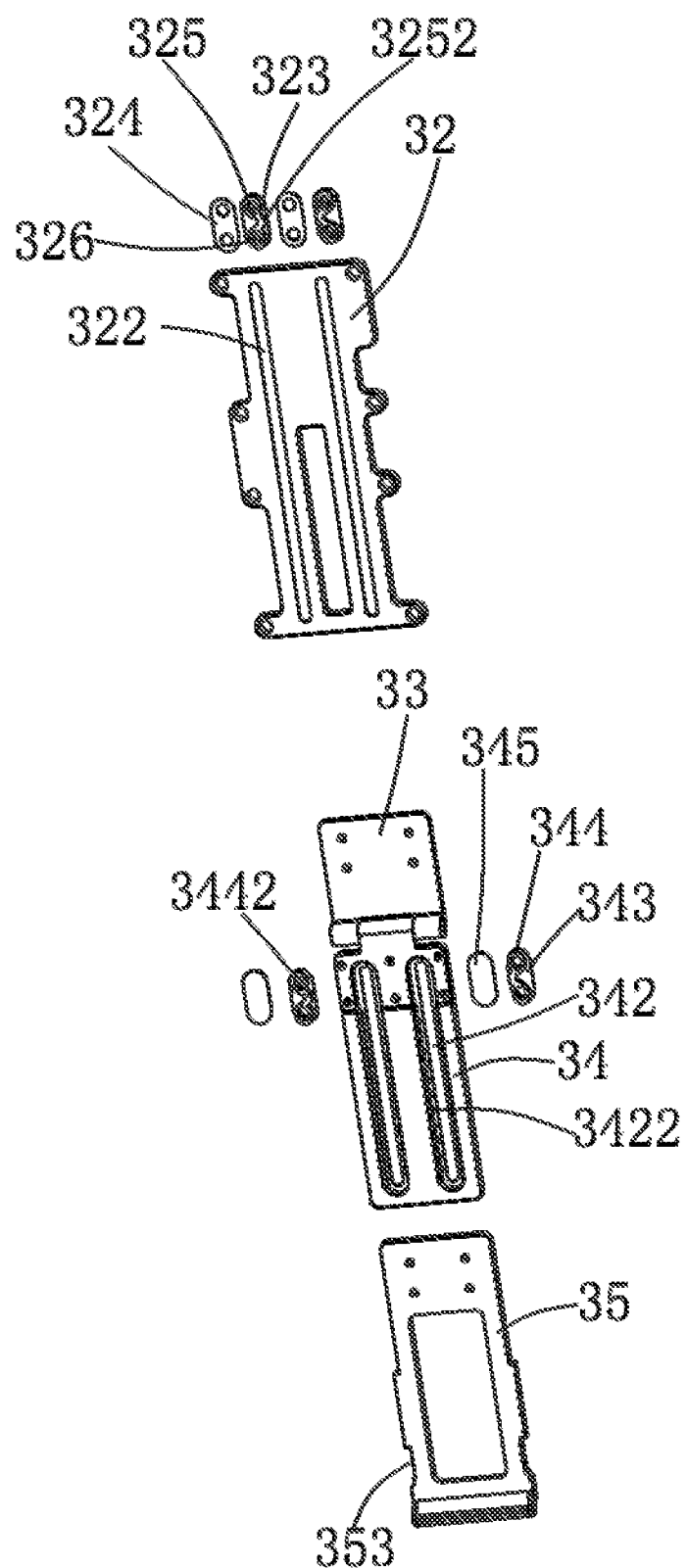
FIG. 10 is an exploded schematic view of a sliding member, a first supporting plate, a second supporting plate and a third supporting plate of the supporting assembly of the clamping mechanism according to FIG. 3.
Figure 11:
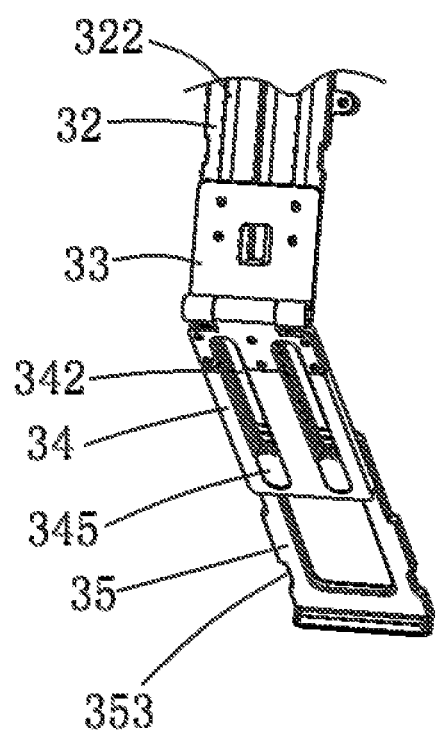
FIG. 11 is a partial schematic view of the sliding member, the first supporting plate, the second supporting plate and the third supporting plate of the supporting assembly of the clamping mechanism according to FIG. 3.

Referring to FIG. 10 and FIG. 11, the clamping mechanism 10 further includes a supporting assembly 30, which includes a sliding member 32, a first supporting plate 33, a second supporting plate 34 and a third supporting plate 35. The lower end of the bracket 12 is provided with a supporting cavity 124 (refer to FIG. 4), and the sliding member 32 is arranged in the supporting cavity 124. A length direction of the sliding member 32 is parallel to a depth direction of the supporting cavity 124. The first supporting plate 33 and the second supporting plate 34 are located at a side of the sliding member 32, and the first supporting plate 33 is slidably connected to the sliding member 32. An end of the second supporting plate 34 is hinged with the first supporting plate 33 through a hinge shaft, that is, the second supporting plate 34 is rotatable relative to the first supporting plate 33, and the first supporting plate 33 and the second supporting plate 34 are sequentially arranged in a direction proximate to the lower end of the bracket 12. The third supporting plate 35 is slidably connected to the side of the second supporting plate 34 proximate to the sliding member 32, that is, the third supporting plate 35 is located between the sliding member 32 and the second supporting plate 34, and the end of the third supporting plate 35 away from the first supporting plate 33 is folded and positioned at the opening end of the supporting cavity 124. The first supporting plate 33 is slidable along the length of the sliding member 32, and the third supporting plate 35 is slidable along the length of the second supporting plate 34.

The first supporting plate 33 is slidably connected with the sliding member 32 through a first sliding unit, which includes a first lower sliding member 323, a first upper sliding member 324 and a first mounting column 326 installed between the first lower sliding member 323 and the first upper sliding member 324. The sliding member 32 is provided with a sliding channel 322 extending along its length, and the first mounting column 326 is inserted in the sliding channel 322. The first mounting column 326 is slidable in the sliding channel 322. The first lower sliding member 323 is located on the side of the sliding member 32 away from the first supporting plate 33, and the first upper sliding member 324 is located on the side of the sliding member 32 proximate to the first supporting plate 33 and connected with the first supporting plate 33, so that the first supporting plate 33 is slidable along the length of the sliding member 32 through the first mounting column 326, the first lower sliding member 323 and the first upper sliding member 324. A first intermediate sliding member 325 is arranged between the first lower sliding member 323 and the first upper sliding member 324. The first intermediate sliding member 325 is located in the sliding channel 322, and a side of the first intermediate sliding member 325 is provided with a sliding member tooth 3252, and the inner wall of a side of the sliding channel 322 is provided with a sliding member tooth 3252 that engages with the sliding member tooth 3252. The sliding member tooth 3252 and the sliding member tooth together play a guiding role during the sliding of the first support plate 33, and the sliding stability of the first support plate 33 can be improved.

The third supporting plate 35 is slidably connected to the second supporting plate 34 through a second sliding unit, which includes a second lower sliding member 343, a second upper sliding member 345, and a second mounting column (not shown in FIG. 10) installed between the second lower sliding member 343 and the second upper sliding member 345. The second supporting plate 34 is provided with a supporting channel 342 extending along its length. The second mounting column, the second lower sliding member 343 and the second upper sliding member 345 are located and slidable in the supporting channel 342, and the second lower sliding member 343 is proximate to the sliding member 32 and connected with the third supporting plate 35, so that the third supporting plate 35 is slidable along the length of the second supporting plate 34 through the second mounting column, the second lower sliding member 343 and the second upper sliding member 345. A second intermediate sliding member 344 is arranged between the second lower sliding member 343 and the second upper sliding member 345. The second intermediate sliding member 344 is located in the supporting channel 342, and a side of the second intermediate sliding member 344 is provided with a first supporting tooth 3442. The inner wall of a side of the supporting channel 342 is provided with a second supporting tooth 3422 which may be engaged with the first supporting tooth 3442. The first supporting tooth 3442 and the second supporting tooth 3422 together play a guiding role during the sliding of the third supporting plate 35, and can improve the sliding stability of the third supporting plate 35.

With the above structures, the bracket 12 can be held, so that the portable display device can be held. Specifically, in practical application, as the end of the third supporting plate 35 away from the first supporting plate 33 is folded and located at the opening end of the supporting cavity 124, the end of the third supporting plate 35 away from the first supporting plate 32 can be manually pulled outward, so that the third supporting plate 35 and the second supporting plate 34 can be pulled out of the supporting cavity 124. In this process, the first supporting plate 33 may slide along the length of the sliding member 32 until the first mounting column is located at an end of the sliding channel 322 proximate to the opening end of the supporting cavity 124. Next, the third supporting plate 35 is pulled away from the first supporting plate 33, and then the second supporting plate 34 is rotated, for example, by 45 degrees, so that the third supporting plate 35 can be driven to rotate 45 degrees relative to the first supporting plate 33, as shown in FIG. 2 and FIG. 11. The end of the third supporting plate 35 away from the first supporting plate 33 is then in contact with, for example, a desktop, so that the bracket 12 can be supported by the third supporting plate 35, the second supporting plate 34 and the first supporting plate 33. When there is no need to support the bracket 12, the second supporting plate 34 is firstly rotated to the initial position by rotation of −45 degrees relative to the first supporting plate 33, so as to drive the third supporting plate 35 to rotate to its initial position relative to the first supporting plate 33. Next, the second supporting plate 34 moves towards the bottom of the supporting cavity 124, so as to drive the first supporting plate 33 and the third supporting plate 35 to move towards the bottom of the supporting cavity 124 until the first supporting plate 33 returns to its initial position. Finally, the third supporting plate 35 is pushed towards the bottom of the supporting cavity 124 until the third supporting plate 35 returns to its initial position. At this time, the first mounting column is located at the end of the sliding channel 322 away from the opening end of the supporting cavity 124, and the end of the third supporting plate 35 away from the first supporting plate 33 is located in the opening end of the supporting cavity 124.

In this embodiment, the numbers of the first sliding unit, the sliding channel 322, the second sliding unit and the supporting channel 342 are two, and it should be appreciated that the number of the first sliding unit, the sliding channel 322, the second sliding unit and the supporting channel 342 can be adjusted according to the actual situation.

As shown in FIG. 6 and FIG. 7, the supporting assembly 30 further includes a sliding button 36 and a movable locking member 37. The lower end of the bracket 12 is provided with a mounting groove 125 (refer to FIG. 4) at a side, such as the right side, of the supporting cavity 124, and the bottom of the mounting groove 125 is provided with an accommodating cavity 126 communicating with the supporting cavity 124. The movable locking member 37 is arranged in the accommodating cavity 126, and the sliding button 36 is arranged in the mounting groove 125. The sliding button 36 partially extends into the accommodating cavity 126 and is connected with the movable locking member 37. In this embodiment, the sliding button 36 has a first concave-convex structure 362 extending into the accommodating cavity 126, and the movable locking member 37 has a second concave-convex structure 372 proximate to the sliding button 36, which is clamped with the first concave-convex structure 362, such that the sliding button 36 and the movable locking member 37 are connected or engaged. An end of the movable locking member 37 proximate to the supporting cavity 124 is approximately trapezoidal and is used to extend into the supporting cavity 124 to engage with a recessed portion 353 on a side of the third supporting plate 35, which is proximate to the end of the third supporting plate 35 away from the first supporting plate 33, as shown in FIG. 10 and FIG. 11. An end of the movable locking member 37 away from the supporting cavity 124 is connected with the inner wall of an end of the accommodating cavity 126 away from the supporting cavity 124 by an elastic connecting member 375, which is preferably a spring. Specifically, an end of the movable locking member 37 away from the supporting cavity 124 is provided with a groove, an end of the elastic connecting member 375 is arranged at the bottom of the groove, and the other end of the elastic connecting member 375 is arranged on the inner wall of an end of the accommodating cavity 126 away from the supporting cavity 124. The sliding button 36 is slidable in the mounting groove 125 in a direction proximate to or away from the supporting cavity 124, and the sliding of the sliding button 36 can drive the movable locking member 37 to move in the direction proximate to or away from the supporting cavity 124 relative to the bracket 12. When the sliding button 36 is located at an end of the mounting groove 125 proximate to the supporting cavity 124, an end of the movable locking member 37 proximate to the supporting cavity 124 extends into the supporting cavity 124 and engages with the recessed portion 353 on the side of the third supporting plate 35. When the sliding button 36 is located at the end of the mounting groove 125 away from the supporting cavity 124, an end of the movable locking member 37 proximate to the supporting cavity 124 is located in the accommodating cavity 126.

In practical application, in an initial state, the sliding button 36 is located at the end of the mounting groove 125 proximate to the supporting cavity 124, and the end of the movable locking member 37 proximate to the supporting cavity 124 extends into the supporting cavity 124 and engages with the recessed portion 353 on the side of the third supporting plate 35 to lock the third supporting plate 35 and the second supporting plate in the supporting cavity 124. When the third supporting plate 35 and the second supporting plate 34 need to be pulled out of the supporting cavity 124, the sliding button 36 is manually pulled away from the supporting cavity 124, and the sliding of the sliding button 36 can drive the movable locking member 37 to move away from the supporting cavity 124. When the sliding button 36 is located at the end of the mounting groove 125 away from the supporting cavity 124, the end of the movable locking member 37 proximate to the supporting cavity 124 is disengaged from the recessed portion 353 of the third supporting plate 35 to realize unlocking, and the elastic connecting member 375 is in a compressed state. At this time, the third supporting plate 35 and the second supporting plate 34 can be pulled out of the supporting cavity 124, and then the sliding button 36 can be released. Under the reset action of the elastic connecting member 375, the movable locking member 37 and the sliding button 36 can be driven to move towards the supporting cavity 124 to return to their initial position. When the sliding button 36 slides away from the supporting cavity 124 and is located at the end of the mounting groove 125 away from the supporting cavity 124, it is only necessary to push the third supporting plate 35, the second supporting plate 34 and the first supporting plate 33 back into the supporting cavity 124, and then sliding button 36 is released. Under the reset action of the elastic connecting member 375, the movable locking member 37 and the sliding button 36 can be driven to reset, and at this time, an end of the movable locking member 37 proximate to the supporting cavity 124 engages with the recessed portion 353 of the third supporting plate 35, so that the third supporting plate 35 and the second supporting plate can be locked in the support cavity 124 again.

Figure 12:
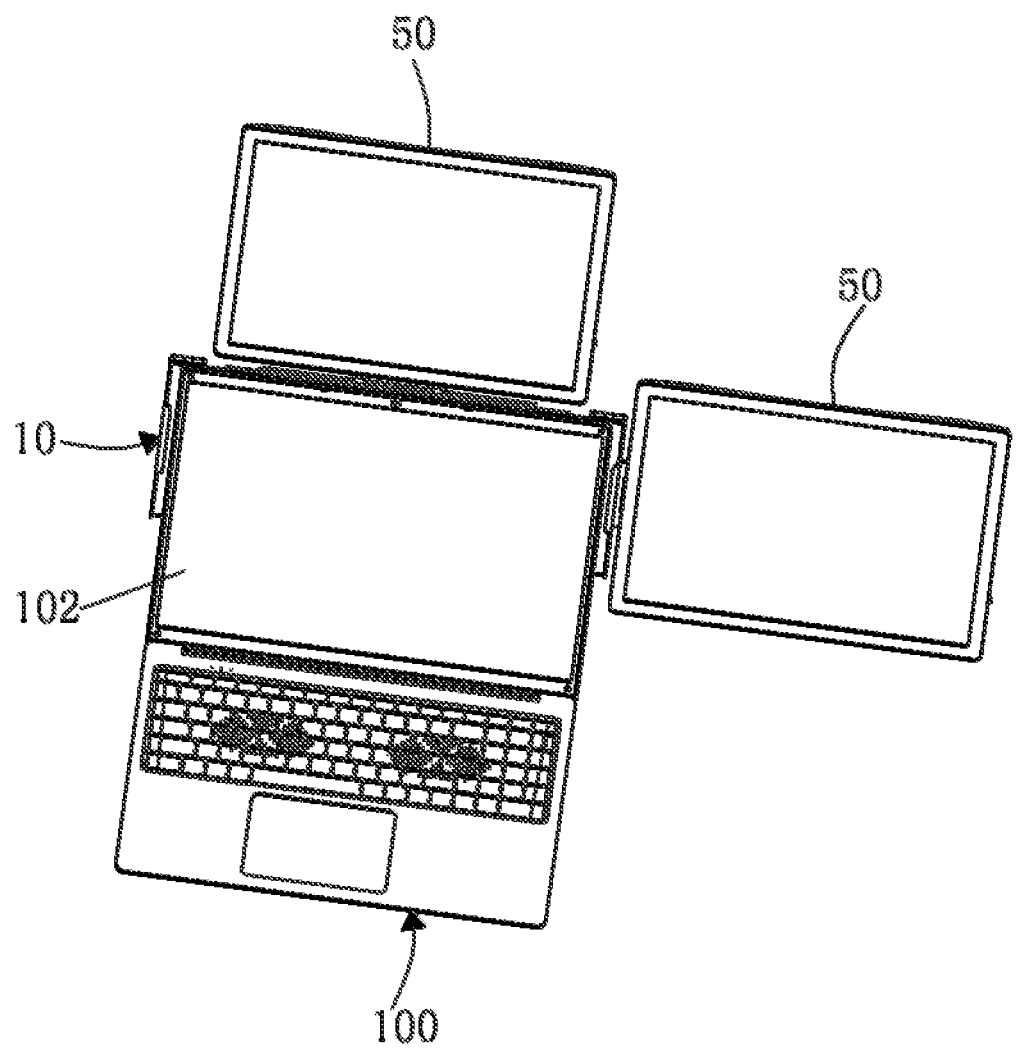
FIG. 12 is a structural schematic diagram of an alternative scheme of a portable display device according to the disclosure.

In an alternative embodiment, there are two display bodies 50, as shown in FIG. 12. The two display bodies 50 can be respectively mounted to the upper and right ends of the display 102 of the laptop 100, or to the upper and left ends or left and right ends of the display 102 of the laptop 100, so as to meet the multi-screen requirements of users.

Figure 13:
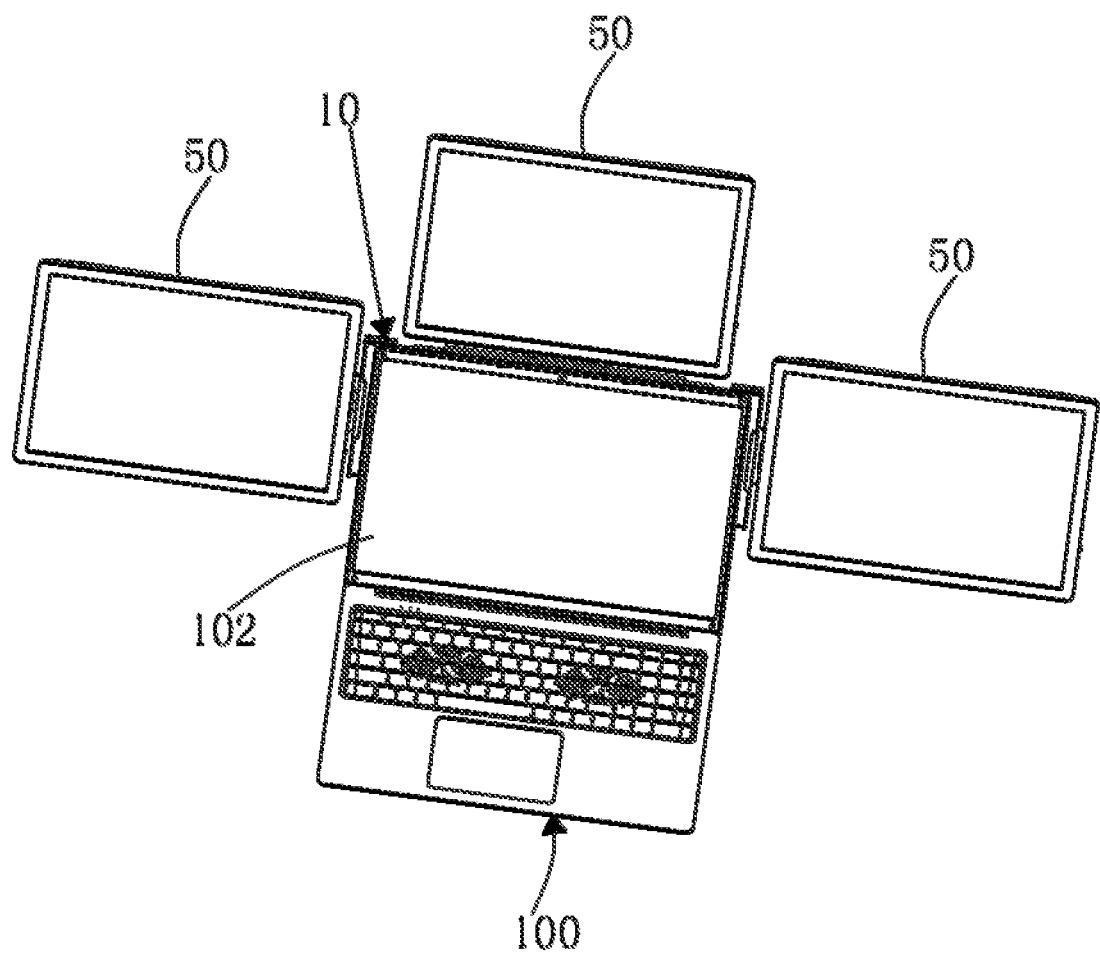
FIG. 13 is a schematic structural diagram of another alternative of a portable display device according to the disclosure.

In an alternative embodiment, there are three display bodies 50, as shown in FIG. 13. The three display bodies 50 can be respectively installed at the upper end, the left end and the right end of the display 102 of the laptop 100, thus meeting the multi-screen requirements of users.

While the disclosure has been described above in terms of specific embodiments, it is to be understood that the disclosure is not limited to these disclosed embodiments. Upon reading the teachings of this disclosure many modifications and other embodiments of the disclosure will come to the mind of those skilled in the art to which this disclosure pertains, and which are intended to be and are covered by both this disclosure and the appended claims.

What is claimed is:

1. A portable display device, characterized in that it comprises a clamping mechanism and a display body, wherein the clamping mechanism comprises a bracket, a left mounting member, a left connecting member connected with the left mounting member, a right mounting member, and a right connecting member connected with the right mounting member; the bracket are provided with two mounting cavities on both sides, and the left mounting member and the right mounting member are respectively arranged in the mounting cavity; the left connecting member and the right connecting member are respectively provided with a left L-shaped clamping element and a right L-shaped clamping element which are symmetrically arranged and configured to clamp opposite portions of a display of a laptop; wherein an upper end of the bracket, an end of the left connecting member away from the bracket and an end of the right connecting member away from the bracket are provided with a slot respectively; and wherein a lower end, a right end and a left end of the display body are respectively provided with an insert subassembly corresponding to the slot, and the insert subassembly is configured to be inserted into and match with the corresponding slot.

2. The portable display device according to claim 1, wherein the left mounting member and the right mounting member are slidable relative to the bracket in a direction proximate to or away from the bracket.

3. The portable display device according to claim 2, wherein an end of the left mounting member away from the left connecting member is provided with a left accommodating groove, and an end of the right mounting member away from the right connecting member is provided with a right accommodating groove;

a left guide rail is accommodated in the left accommodating groove, an end of the left guide rail away from the left connecting member extends out of the left accommodating groove and is arranged at the bottom of the corresponding mounting cavity; a right guide rail is accommodated in the right accommodating groove, an end of the right guide rail away from the right connecting member extends out of the right accommodating groove and is arranged at the bottom of the corresponding mounting cavity; the left mounting member is slidable along the left guide rail, and the right mounting member is slidable along the right guide rail.

4. The portable display device according to claim 3, wherein the left guide rail is sleeved with a left elastic member, an end of the left elastic member is connected with an inner wall of an opening end of the left accommodating groove, and the other end of the left elastic member is connected with an end of the left guide rail proximate to the left connecting member; the right guide rail is sleeved with a right elastic member, an end of the right elastic member is connected with an inner wall of an opening end of the right accommodating groove, and the other end of the right elastic member is connected with an end of the right guide rail proximate to the right connecting member.

5. The portable display device according to claim 1, wherein the insert subassembly comprises a fixed member and a movable member;
   a left end, a right end and a lower end of the display body are respectively provided with a mounting groove extending to the rear outer wall of the display body and corresponding to the insert subassembly;
   wherein the fixed member is arranged in the corresponding mounting groove, and the movable member is at least partly arranged the corresponding mounting groove and is hinged with the fixed member, and the movable member is configured to be inserted into and match with the corresponding slot.

6. The portable display device according to claim 5, wherein the clamping mechanism further comprises a left locking assembly, a right locking assembly and an upper locking assembly, wherein the left locking assembly, the right locking assembly and the upper locking assembly each comprise a push button, an extension plate, a connecting column and an elastic reset member;
   the slots of the left connecting member, the right connecting member and the bracket respectively define a left accommodating position, a right accommodating position and an upper accommodating position; the movable member is provided with a hole between the fixed member and an opening of the movable member, the opening of the movable member is provided at an end of the movable member away from the fixed member;
   the push button of the left locking assembly is arranged in a through hole of the left connecting member, has a first end located outside the left connecting member and a second end passing through the slot of the left connecting member and extending to the left accommodating position; and is sleeved with the extension plate; an end of the connecting column is arranged on the left connecting member, and the other end of the connecting column is accommodated at the left accommodating position and in a mounting groove of the push button; the elastic reset member is sleeved on the connecting column, a first end of the elastic reset member is connected with the bottom of the mounting groove of the push button, and a second end of the elastic reset member is connected with an end of the connecting column proximate to the left connecting member; the extension plate has a limiting block located in the slot of the left connecting member and restricted by the hole of the corresponding movable member;
   the push button of the right locking assembly is arranged in a through hole of the right connecting member, has a first end located outside the right connecting member and a second end passing through the slot of the right connecting member and extending to the right accommodating position, and is sleeved with the extension plate; an end of the connecting column is arranged on the right connecting member, and the other end of the connecting column is accommodated at the right accommodating position and in a mounting groove of the push button; the elastic reset member is sleeved on the connecting column, a first end of the elastic reset member is connected with the bottom of the mounting groove of the push button, and a second end of the elastic reset member is connected with an end of the connecting column proximate to the right connecting member; the extension plate has a limiting block located in the slot of the right connecting member and restricted by the hole of the corresponding movable member; and
   the push button of the upper locking assembly is arranged in a through hole of the bracket, has a first end located outside the bracket and a second end passing through the slot of the bracket and extending to the upper accommodating position, and is sleeved with the extension plate; an end of the connecting column is arranged on the bracket, and the other end of the connecting column is accommodated at the upper accommodating position and in the mounting groove of the push button; a first end of the elastic reset member is connected with the bottom of the mounting groove, and a second end of the elastic reset member is connected with an end of the connecting column proximate to the front inner wall of the bracket; the extension plate has a limiting block located in the slot of the bracket and restricted by the hole of the corresponding movable member.

7. The portable display device according to claim 1, wherein the left L-shaped clamping element and the right L-shaped clamping element are respectively provided with a left clamping portion configured to clamp with the left end of the display of the laptop and a right clamping portion configured to clamp with the right end of the display of the laptop, the left clamping portion and the right clamping portion are arranged oppositely.

8. The portable display device according to claim 1, wherein the clamping mechanism further comprises a supporting assembly including a sliding member, a first supporting plate, a second supporting plate and a third supporting plate, wherein the sliding member is arranged in a supporting cavity at the lower end of the bracket, a length direction of the sliding member is parallel to a depth direction of the supporting cavity, and wherein the first supporting plate and the second supporting plate are located at the same side of the sliding member, the first supporting plate is slidably connected to the sliding member, the second supporting plate is hinged with the first supporting plate, and the third supporting plate is slidably connected to the second supporting plate; and wherein an end of the third supporting plate away from the first supporting plate is folded and located in the opening end of the supporting cavity; the first supporting plate is slidable along the length of the sliding member, and the third supporting plate is slidable along the length of the second supporting plate.

9. The portable display device according to claim 8, wherein the supporting assembly further comprises a sliding button and a movable locking member, the bracket is provided with a mounting groove on one side of the supporting cavity, and the mounting groove defines an accommodating cavity communicating with the supporting cavity; the movable locking member is arranged in the accommodating cavity, the sliding button is arranged in the mounting groove and partially extends into the accommodating cavity to engage with the movable locking member; an end of the movable locking member proximate to the supporting cavity extends into the supporting cavity and engages with a recessed portion of the third supporting plate; an end of the movable locking member away from the supporting cavity is connected with the inner wall of the accommodating cavity away from the supporting cavity through an elastic connecting member; the sliding button is slidable in the mounting groove in a direction proximate to or away from the supporting cavity, such that the movable locking member moves in the direction proximate to or away from the supporting cavity.

10. The portable display device according to claim 1, wherein the number of the display body is selected from one of one, two or three.

* * * * *